(12) United States Patent
Prasad et al.

(10) Patent No.: US 12,541,657 B2
(45) Date of Patent: Feb. 3, 2026

(54) SYSTEM AND A METHOD FOR PHONETIC-BASED TRANSLITERATION

(71) Applicant: TALENT UNLIMITED ONLINE SERVICES PRIVATE LIMITED, Delhi (IN)

(72) Inventors: Rahul Prasad, Gurugram (IN); Ankit Prasad, Gurugram (IN)

(73) Assignee: TALENT UNLIMITED ONLINE SERVICES PRIVATE LIMITED (IN)

( * ) Notice: Subject to any disclaimer, the term of this patent is extended or adjusted under 35 U.S.C. 154(b) by 457 days.

(21) Appl. No.: 17/965,758

(22) Filed: Oct. 13, 2022

(65) Prior Publication Data

US 2023/0116268 A1  Apr. 13, 2023

(30) Foreign Application Priority Data

Oct. 13, 2021 (IN) .............................. 202111046729

(51) Int. Cl.
*G06F 40/151* (2020.01)
*G06F 40/51* (2020.01)
*G06F 40/58* (2020.01)

(52) U.S. Cl.
CPC .............. *G06F 40/51* (2020.01); *G06F 40/58* (2020.01)

(58) Field of Classification Search
CPC .......... G06F 40/51; G06F 40/58; G06F 40/45; G06F 40/53
See application file for complete search history.

(56) References Cited

U.S. PATENT DOCUMENTS

| | | | | |
|---|---|---|---|---|
| 2008/0270111 | A1* | 10/2008 | Hanumanthappa ... | G06F 40/151 704/3 |
| 2011/0099000 | A1* | 4/2011 | Rai ...................... | G06F 40/129 704/2 |
| 2017/0177569 | A1* | 6/2017 | Raemy ................. | G06F 40/205 |
| 2017/0371850 | A1* | 12/2017 | Mukhopadhyay .... | G06F 40/242 |
| 2018/0322112 | A1* | 11/2018 | Bellegarda ............ | G06F 40/44 |

* cited by examiner

*Primary Examiner* — Abul K Azad
(74) *Attorney, Agent, or Firm* — Goudie, PLLC

(57) ABSTRACT

A system and a method for converting text in one of a plurality of input languages into a text in a second language using phonetic based transliteration are disclosed. The method includes receiving (802) an input text in a first script from a user; phonetically mapping (804) each character of the input text with a second script corresponding to the second language; validating (806) permutations of mapping of each input character with each character of second script and transliterating (808) input text in first script into an output text in second script. A transliteration engine (106) is configured to transliterate input text of first language into the output text of second language. The transliteration engine (106) includes a data reception module (108), a data transformation module (110), a training module (112), an inference module (114), and a database (116).

11 Claims, 11 Drawing Sheets

Semiring examples. $\oplus_{\log}$ is defined by: $x \oplus_{\log} y = -\log(e^{-x} + e^{-y})$

| SEMIRING | SET | $\oplus$ | $\otimes$ | $\bar{0}$ | $\bar{1}$ |
|---|---|---|---|---|---|
| Boolean | $\{0,1\}$ | $\vee$ | $\wedge$ | 0 | 1 |
| Probability | $\mathbb{R}_+$ | $+$ | $\times$ | 0 | 1 |
| Log | $\mathbb{R} \cup \{-\infty, +\infty\}$ | $\oplus_{\log}$ | $+$ | $+\infty$ | 0 |
| Tropical | $\mathbb{R} \cup \{-\infty, +\infty\}$ | min | $+$ | $+\infty$ | 0 |
| String | $\Sigma^* \cup \{\infty\}$ | lcp | $\cdot$ | $\infty$ | $\varepsilon$ |

FIG.7

SYSTEM AND A METHOD FOR PHONETIC-BASED TRANSLITERATION

BACKGROUND

Technical Field

The embodiments herein, in general, relate to transliteration. More particularly, the embodiments herein relate to a system and a method for transliteration based on phonetic mapping. Further, the embodiments herein provide systems and methods for inputting language into a computing device based on a phonetic-based scheme.

Description of the Related Art

In a general sense, transliteration is defined as a process of translation of text of one literature to other based on pronunciation. Transliteration is an important process in many multilingual natural language tasks. An essential component of transliteration approaches is a verification mechanism that evaluates if the two words of different languages are phonetically accurate translations of each other. Although many systems have transliteration generation (recognition) as a component, stand-alone verification is relatively new. Most of the existing transliteration methods follow word to word mapping, for example, Latin words were directly mapped to words in a native language. Transliteration using word to word mapping does not provide accurate results and also deceit the users of a good typing experience. Further, verification has been used as an essential step for transliteration and the existing prior-art fail to provide an effective validation process which are time efficient and accurate. Also, in many cases, there is no agreed upon standard romanization system, leading to an increase in ambiguity and noise when decoding to the target words in the native script.

Hence, there is a need for a system and a method that yields substantial accuracy improvements and latency reductions over the existing transliteration methods.

OBJECTIVES OF THE EMBODIMENTS HEREIN

A primary object of the embodiments herein is to develop a system and a method for transliteration based on grapheme to phoneme mapping and cross-lingual pronunciation mapping models.

Another object of the embodiments herein is to utilize a single, pre-trained transliteration model for all different languages for reducing time required for training multiple different artificial intelligence (AI) models.

Yet another object of the embodiments herein is to transliterate text in any input language (or first language) to text comprising characters of a base language (or a second language) based on pronunciation.

Yet another object of the embodiments herein is to utilize a conventional word mapping algorithm along with the pretrained transliteration model.

Yet another object of the invention is to utilize a character mapping algorithm along with the pretrained transliteration model The objects disclosed above will be realized and achieved at least by the elements, features, and combinations particularly pointed out in the detailed description of the embodiments herein. The objects disclosed above have outlined, rather broadly, the features of the embodiments herein in order that the detailed description that follows may be better understood. The objects disclosed above are not intended to determine the scope of the claimed subject matter and are not to be construed as limiting the embodiments herein. Additional objects, features, and advantages of the embodiments herein are disclosed below. The objects disclosed above, which are believed to be characteristic of the embodiments herein, both as to its organization and method of operation, together with further objects, features, and advantages, will be better understood and illustrated by the technical features broadly embodied and described in the following description when considered in connection with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

According to an embodiment herein, a method for converting text in one of a plurality of input languages into a text in a second language using phonetic based transliteration is provided. The method includes receiving an input text in a first script from a user. Each character of the input text is phonetically mapped with a second script corresponding to the second language. The permutations of mapping of each, input character with, each character of the second script is validated and the input text in the first script is transliterated into an output text in the second script.

According to an embodiment herein, the step of transliterating includes performing a machine transliteration using an artificial intelligence (AI)-based transliteration engine executable by at least one processor for converting text in any input language into output text.

According to an embodiment herein, the step of transliterating includes transliterating text in an input language to a text including one or more characters of a base language.

According to an embodiment herein, the step of transliterating includes transliterating text using a speech transliteration engine, and wherein a text includes Latin or English characters to a text including characters of Devanagari or Hindi characters, based on mapping of the phonetics instead of word mapping using a pre-trained artificial intelligence (AI) model.

According to an embodiment herein, the AI based transliteration engine is integrated into an input interface of a user device.

According to an embodiment herein, the AI based transliteration engine utilizes a Unicode symbol sequence.

According to an embodiment herein, the AI based transliteration engine is configured to utilize expectation maximization (EM) algorithm as an approach for performing maximum likelihood estimation in the presence of latent variables. The latent variables are the variables not directly observed and are actually inferred from the values of the other observed variables.

According to an embodiment herein, the expectation maximization (EM) algorithm is used for the latent variables to predict, the values with the condition that a general form of probability distribution governing the latent variables is known.

According to an embodiment herein, the method further includes performing a grapheme to phoneme (G2P) conversation using a per-symbol alignment of an input string and an output string. Grapheme-to-Phoneme (G2P) conversion is a technique related to Natural Language Processing, Speech Recognition and Spoken Dialog Systems development.

According to an embodiment herein, a primary goal of G2P conversion is to accurately predict the pronunciation or transliteration of a novel input word given the spelling. The G2P conversion process is typically broken down into several sub-processes. The subprocesses includes (1) Sequence alignment, (2) Model training and, (3) Decoding processes. The goal of Sequence alignment process is to align the grapheme and phoneme sequence pairs in a training dictionary. The goal of Model training process is to produce a model to generate new transliteration for novel words. The goal of Decoding process is to find the most likely pronunciation given the model.

According to an embodiment herein, a method for converting input text into output text is provided. The method comprises the step of checking if the user device is downloaded with the weighted finite-state transducer (WFST) algorithm. The input text is provided to the WFST model. The input text is converted to a first output text, when the WFST algorithm is downloaded. The method still further includes proceeding with the word mapping algorithm as the fallback when the WFST model is not downloaded in the user device. The method further includes checking when the input text matches with a prestored native words through direct mapping process. The method further includes forwarding the input text through the word mapping algorithm and generating a second output text if input matches with the prestored native words and forwarding the input text through the character mapping algorithm and generating a third output text if the input does not match with the prestored native words.

According to an embodiment herein, the WFST is a finite-state machine includes two memory tapes, including an input tape and an output tape for tuning machines.

According to an embodiment herein, the word mapping algorithm is based on direct mappings of the words.

According to an embodiment herein, the character mapping algorithm implies mapping of characters of the input text to phonetically similar sounding characters of the output text.

According to an embodiment herein, a system for phonetic-based transliteration is provided. The system includes a memory for storing one or more executable modules and a processor for executing the one or more executable modules for phonetic-based transliteration. The one or more executable modules includes a transliteration engine configured to transliterate input text of first language into the output text of second language. The transliteration engine includes a data reception module for receiving an input text in an input language, a data transformation module is used for transforming the input text into a transliterated text including one or more characters in a second language, a training module for training a pre-trained model and decoding an output text of the trained model to generate text including characters of the second language, an inference module for executing the inference stage by receiving a text file as input, processing the input text data through the pre-trained language model and generating output text data in a second language; and a database is used for storing text files received as input text for transliteration and a corpus containing large datasets of curated and augmented texts.

According to an embodiment herein, the encoder is configured to train a pre-trained model with the data files and corresponding transliterated text using transfer learning.

According to an embodiment herein, the decoder is configured to perform decoding and the decoder improves the accuracy of the generated text including characters of the second language.

According to an embodiment herein, the data transformation module transliterates the generated text to output text including characters in the second language.

According to an embodiment herein, the transliteration engine is executed by the processor and causes the processor to transliterate input text of first language into the output text of second language.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

BRIEF DESCRIPTION OF THE DRAWINGS

The foregoing summary, as well as the following detailed description, is better understood when read in conjunction with the appended drawings. For illustrating the embodiments herein exemplary constructions of the embodiments herein are shown in the drawings. However, the embodiments herein are not limited to the specific methods and components disclosed herein. The description of a method step or a component referenced by a numeral in a drawing is applicable to the description of that method step or component shown by that same numeral in any subsequent drawing herein.

The other objects, features, and advantages will occur to those skilled in the art from the following description of the preferred embodiment and the accompanying drawings in which:

FIG. 7 illustrates various semiring types, according to an embodiment herein.

Figure 1:
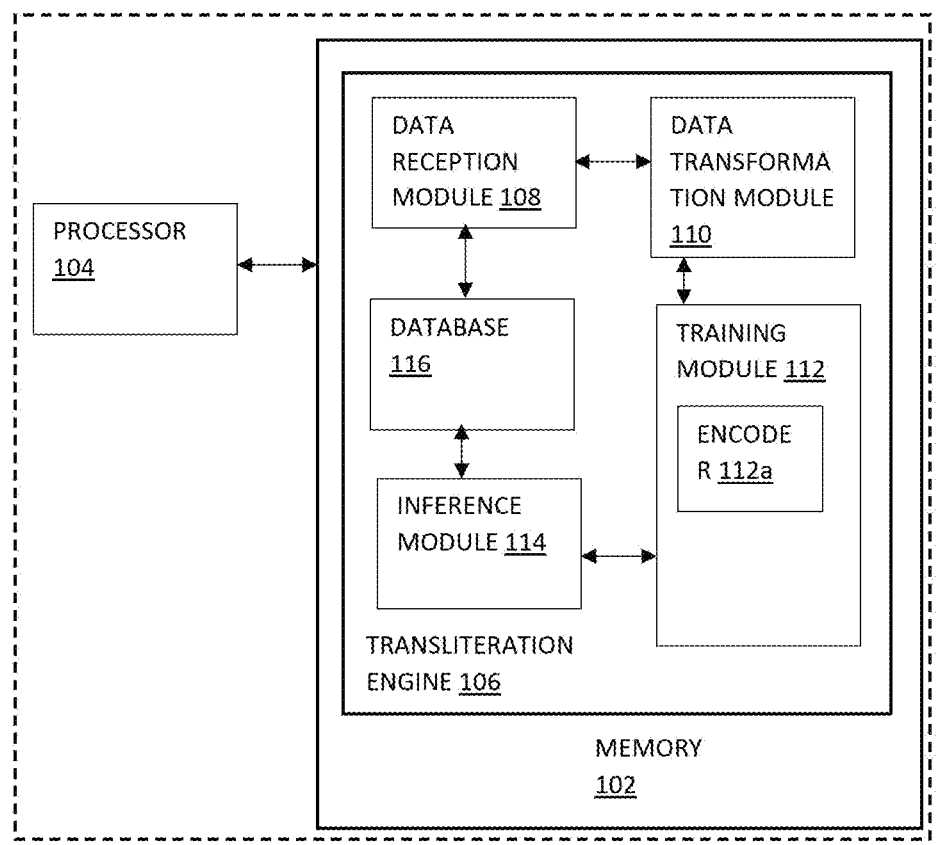
FIG. 1 illustrates a block diagram of a system for transliterating text, in one of a plurality of input languages into out text using machine transliteration, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

The detailed description of various exemplary embodiments of the disclosure is described herein with reference to the accompanying drawings. It should be noted that the embodiments herein are described herein in such details as to clearly communicate the disclosure. However, the amount of details provided herein is not intended to limit the anticipated variations of embodiments; on the contrary, the intention is to cover all modifications, equivalents, and alternatives falling within the spirit and scope of the present disclosure as defined by the appended claims.

It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternatives falling within the scope of the disclosure.

The embodiments herein provide a system and method for transliteration based on graphene to phoneme mapping and cross-lingual pronunciation mapping models. The embodiments herein transliterate text in any input language (or first language) to text comprising characters of a base language (or a second language) based on pronunciation. The system and method utilize a conventional word mapping algorithm along with the pretrained transliteration model. The embodiments herein use a character mapping algorithm along with the pretrained transliteration model for transliterating.

According to an embodiment herein, a method for converting text in one of a plurality of input languages into a text in a second language using phonetic based transliteration is provided. The method comprising the steps of receiving (802) an input text in a first script from a user; phonetically mapping (804) each character of the input text with a second script corresponding to the second language: validating (806) permutations of mapping of each input character with each character of the second script: and transliterating (808) the input text in the first script into an output text in the second script.

According to an embodiment herein, the step of transliterating comprises performing a machine transliteration using an artificial intelligence (AI)-based transliteration engine (106) executable by at least one processor for converting text in any input, language into output text.

According to an embodiment herein, the step of transliterating comprises transliterating text in an input language to a text comprising one or more characters of a base language.

According to an embodiment herein, the step of transliterating comprises using a speech transliteration engine to transliterate a text comprising Latin or English characters to a text comprising characters of Devanagari or Hindi characters, based on mapping of the phonetics instead of word mapping using a pre-trained artificial intelligence (AI) model.

According to an embodiment herein, the AI based transliteration engine is integrated into an input interface (401) of a user device.

According to an embodiment herein, the AI based transliteration engine utilizes a Unicode symbol sequence.

According to an embodiment herein, the AI based transliteration engine is configured to utilize Expectation Maximization (EM) algorithm as an approach for performing maximum likelihood estimation in the presence of latent variables.

According to an embodiment herein the latent variables are the variables not directly observed and are actually inferred from the values of the other observed variables.

According to an embodiment herein, an expectation maximization (EM) algorithm is used for latent variables to predict the values with the condition comprising a general form of probability distribution governing the latent variables is known.

According to an embodiment herein, the method further comprises performing a grapheme to phoneme (G2P) conversation using a per-symbol alignment of an input string and an output string.

According to an embodiment herein, a primary goal of G2P conversion is to accurately predict the pronunciation or transliteration of a novel input word given the spelling.

According to an embodiment herein, a method for converting input text into output text is provided. The method comprising the steps of checking (301)/(902) if the user device is downloaded with a weighted finite state transducer (WFST) algorithm; providing (302)/(904) the input text to the WFST model and converting the input text to the output text-1 if the WFST algorithm is downloaded proceeding (906) with the word mapping algorithm as the fallback if the WFST model is not downloaded in the user device; checking (303)/(908) if the input text matches with a prestored native words through direct mapping process; forwarding (304)/(910) the input text through the word mapping algorithm and generating output text-2, if input matches with the prestored native words; and forwarding (305)/(912) the input text through the character mapping algorithm and generating output text-3, if the input does not match with the prestored native words.

According to an embodiment herein, the weighted finite-state transducer (WFST) is a finite-state machine comprising two memory tapes, following the terminology for tuning machines comprising an input tape and an output tape.

According to an embodiment herein, the word mapping algorithm is implemented for direct mappings of the words.

According to an embodiment herein, the character mapping algorithm is executed for mapping of characters of the input text to phonetically similar sounding characters of the output text.

According to an embodiment herein, a system for phonetic-based transliteration is provided. The system comprises a memory (102) for storing one or more executable modules; and a hardware processor (104) for executing the one or more executable modules for phonetic-based transliteration, The one or more executable modules comprises a transliteration engine (106) configured to transliterate input text of first language into the output text of second language, the transliteration engine comprising: a data reception module (108) for receiving an input text in an input language; a data transformation module (110) for transforming the input text into a transliterated text comprising one or more characters in a second language; a training module (112) comprising an encoder (112a) and a decoder (112b) for training a pre-trained model and decoding an output text of the trained model to generate text comprising characters of the second language; and an inference module (114) for executing the inference stage by receiving a text file as input, processing the input text data through the pre-trained language model, and generating output text data in a second language.

According to an embodiment herein, the encoder (112a) is configured to train a pre-trained model with the data files and corresponding transliterated text using transfer learning.

According to an embodiment herein, the decoder (112b) is configured to perform decoding and decoder improves the accuracy of the generated text comprising characters of the second language.

According to an embodiment herein, the data transformation module (110) transliterates the generated text to output text comprising characters in the second language.

According to an embodiment herein, the transliteration engine (106) is executed by the processor and causes the processor to transliterate input text of first language into the output text of second language.

FIG. 1 illustrates a block diagram of a system for transliterating text in one of a plurality of input languages into out text using machine transliteration, according to an embodiment herein. According to an embodiment herein, the system 100 for phonetic-based transliteration, includes:
  a memory (102) for storing one or more executable modules; and
  a processor (104) for executing the one or more executable modules for phonetic-based transliteration, the one or more executable modules comprising:
    a transliteration engine (106) configured to transliterate input text of first language into the output text of second language, the transliteration engine comprising:
      a data reception module (108) for receiving an input text in an input language;
      a data transformation module (110) for transforming the input text into a transliterated text comprising one or more characters in a second language;
      a training module (112) comprising an encoder (112a) and a decoder (112b) for training a pre-trained model and decoding an output text of the trained model to generate text comprising characters of the second language; and
      an inference module (114) for executing the inference stage by receiving a text file as input, processing the input text data through the pre-trained language model, and generating output text data in a second language.

According to an embodiment herein, the modules of the transliteration engine 106 are stored in the memory unit 102, The processor 104 is operably and communicatively coupled to the memory unit 102 for executing the computer program instructions defined by the modules of the transliteration engine 106. The transliteration engine 106 is not limited to employing the processor 104. According to an embodiment herein, the transliteration engine 106 employs one or more controllers or microcontrollers. The transliteration engine 106 comprises modules defining computer program instructions, which when executed by the processor 104, cause the processor 104 to transliterate input text of first language into the output text of second language. The database 116 stores, for example, text files received as input text for transliteration and a corpus containing large datasets of curated and augmented texts. The data reception module 108 receives an input text in any input language, for example, Latin characters of English language. The data transformation module 110 transforms the input text into transliterated text comprising characters of a second, language. According to an embodiment herein, the training module 112 comprises an encoder 112a and a decoder 112b. The encoder 112a trains a pre-trained model with the data files and corresponding transliterated text using transfer learning. The acoustic model is pre-trained on multiple datasets of the base language. The decoder 112b performs decoding, for example, an output text of the trained model to generate text comprising characters of the second language. According to an embodiment herein, decoder 112b improves the accuracy of the generated, text comprising characters of the second language, for example, Hindi, by using a pre-trained customized language model. The data transformation module 110 then transliterates the generated text to output text comprising characters in the second language. The inference module 114 executes the inference stage, where the inference module 114 receives a text file as input, processes the input text data through the pre-trained language model, and through the pretrained customized language model, and generates output text data in a second language, according to an embodiment herein.

Figure 2:
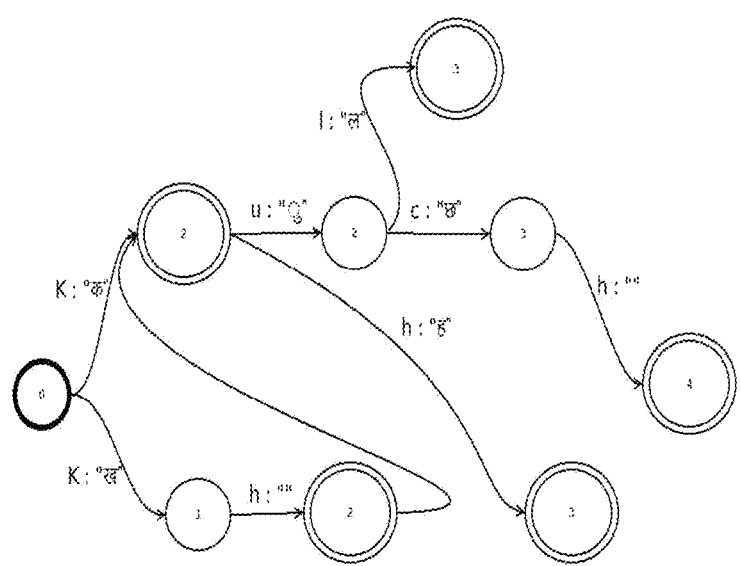
FIG. 2 illustrates a fragment topology of a bigram pair language model as a WFST, according to an embodiment herein.

FIG. 2 illustrates a fragment topology of a bigram pair language model as a weighted finite-state transducer (WFST), according to an embodiment herein. The WFST is a state machine which validates every input character and if the input is matched, there is some output that corresponds to every input state. As per FIG. 2, the finite state machine converts the input sequence into the output sequence of native characters which, on reaching a final state, provide the final output. The bigram has the incoming arcs into any state which are labelled, with the same pair symbol, e.g., state 4. In one embodiment, the WFST model is trained with open FST which helps in creating a big state machine from all the valid inputs provided at the time of training the model that is further decompiled using the same open FST. For example, sample sets of Hindi training data to create a state machine model for Hindi language is shown in the below table as per FIG.

TABLE 1

| Latin Word | Corresponding Phonemes/ Unicode's of native language |
|---|---|
| Cat | कॅट |
| Ki | की |
| Koi | कोई |
| Kiya | किया |

Figure 3:
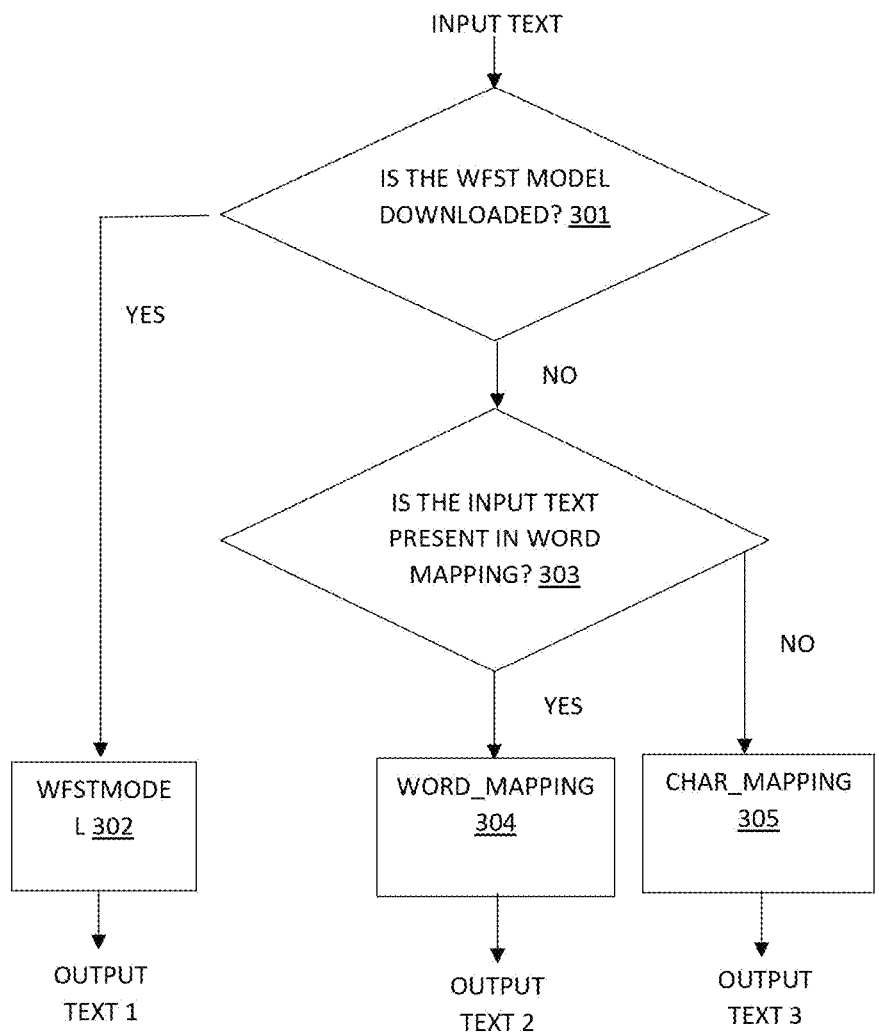
FIG. 3 illustrates a flowchart of an implementation of a method for converting input text into output text using combination of algorithms of WFST, character mapping algorithm, and the word mapping algorithm, according to an embodiment herein.

FIG. 3 illustrates a flowchart of an implementation of a method for converting input text into output text using combination of algorithms of WFST, character mapping algorithm, and the word mapping algorithm, according to an embodiment herein. As per FIG. 3, the transliteration engine is configured with a fallback combination of three algorithms of WFST, character mapping algorithm, and the word mapping algorithm. The user device is configured with the transliteration engine wherein the transliteration engine, at 301, is configured to check if the user device is downloaded with the WFST model. If yes, the transliteration engine 106 is configured to provide the input text to the WFST model 302 and convert the input text to the output text 1 as described further in FIG. 8. Alternatively, if the WFST model 302 is not downloaded in the user device, the transliteration engine 106 is configured to proceed with the word mapping algorithm as the fallback. The word mapping algorithm is based on direct mappings of the words. For example, the word mapping utilizes few direct mappings of Latin words as to a corresponding native word such as Devanagari word. If the user input Latin word matches exactly to the native word, the corresponding native word is shown as the output. At 303, the transliteration engine 106 checks if the input text matches with a prestored native words through direct mapping process. If yes, at 304, the transliteration engine 106 forwards the input text through the word mapping algorithm and generates output text 2. If no, at 305, the transliteration engine 106 forwards the input text through the character mapping algorithm and generates output text 3.

According to one embodiment herein, the character mapping algorithm implies mapping of characters of the input text to phonetically similar sounding characters of the output text, in one example, the characters of the Latin alphabet are mapped to Devanagari language characters. The process of mapping incudes a set of Latin (English) mapped words are taken for any particular language, such as Devanagari, proceeding further, word-by-word, the phonetics of the word are mapped to the Latin characters' phonemes. A list of words, corresponding native word mapping is given to a native language expert who breaks the word phonetics mapping after which the below file is made which is called phonetics character mapping file. For an example of the Devanagari word, कुछ consider below mapping table,

TABLE 3

| Latin character | Devanagari corresponding phoneme |
|---|---|
| K | "क" |
| U | "ु" |
| Ch | "छ" |

The above part is creation of phonetics mapping which is known as encoding. After this the decoding is carried out by the transliteration engine which mainly contributes to the conversion of input txt to corresponding transliterated output text. In one example, for decoding, the Latin input is taken from the user, and the word is broken down into the characters with all the possible permutations available in the Latin character mapping set. For example, if input is received as 'kuch' then the possible permutations would be "k u c h", "k u ch". Then all the permutations for the possible phonemes will be calculated by replacing the Devanagari phoneme mapping for each Latin sound available. For the input text "kuch" below available mappings are the possible permutations,

TABLE 2

| Character (Latin) | Mapping (phonetic mapping in the native language) |
|---|---|
| K | "क्", "क" |
| U | "उ", "ु" |
| C | "क" |
| H | "ह" |
| Ch | "छ" |

As per Table. 2, possible permutations for "k u c h=>" "क्उकह", "क्ुकह", "कउकह", "कुकह" and possible permutations for "k u ch"=>" "क्उछ", "क्ुछ", "कउछ", "कुछ". Out of given permutations, the only output which is relevant here is "कुछ", which is validated from a given dictionary of the respective language. After validation, all the other outputs will be discarded, and the final output will be "कुछ" for input Latin word "kuch."

According to one embodiment herein, the transliteration engine 106 checks if the keyboard of the user device is a QWERTY keyboard. If not, the transliteration engine 106 is configured to proceed with the word mapping algorithm as the fallback. The word mapping algorithm is based on direct mappings of the words. The transliteration engine 106 checks if the input text matches with a prestored native words through direct mapping process. If yes, the transliteration engine 106 forwards the input text through the word mapping algorithm and generates output text 2. If no, the transliteration engine 106 forwards the input text through the character mapping algorithm and generates output text 3.

Figure 4A:
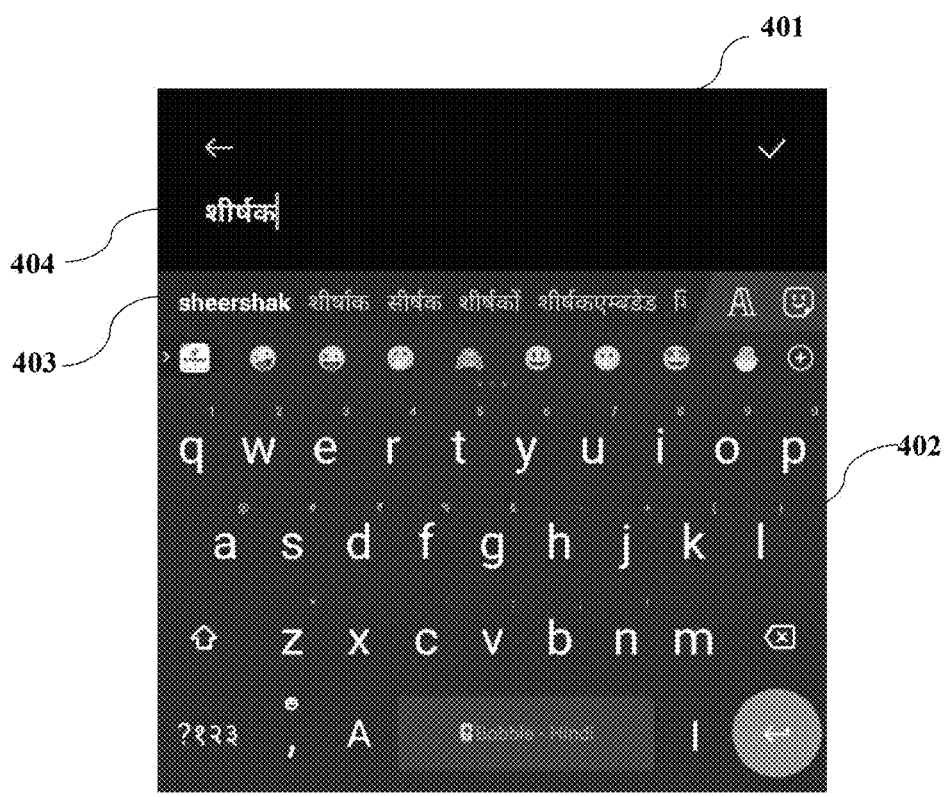
FIG. 4A-4C exemplarily illustrates a graphical representation displayed on a display unit of an electronic device, showing a transliterated text suggestions on a suggestion bar interface, according to an embodiment herein.
Figure 4B:
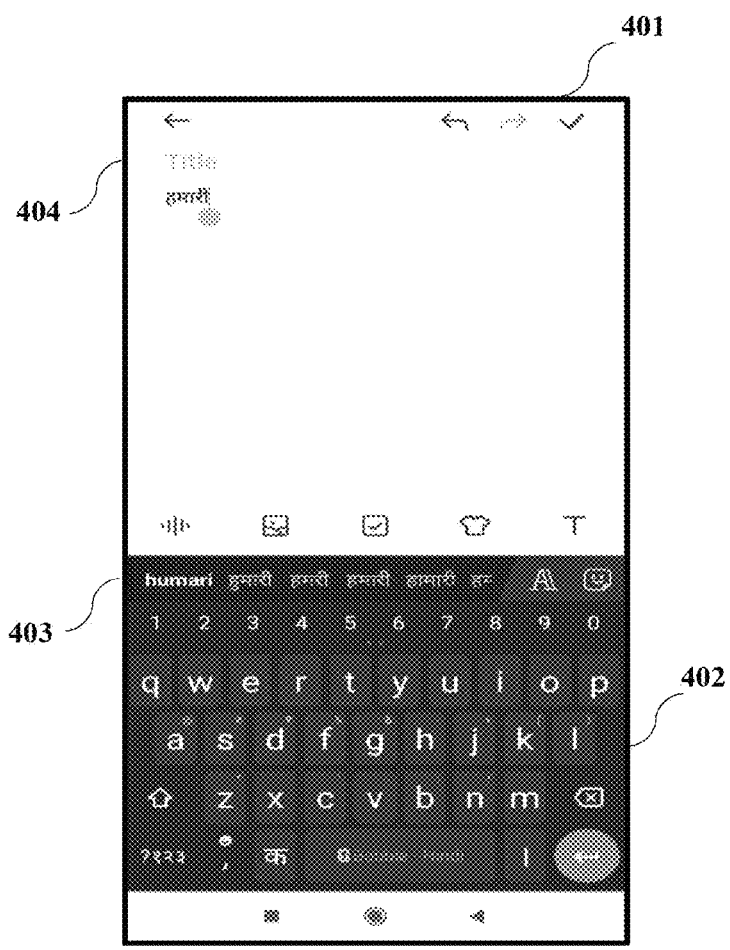
Figure 4C:
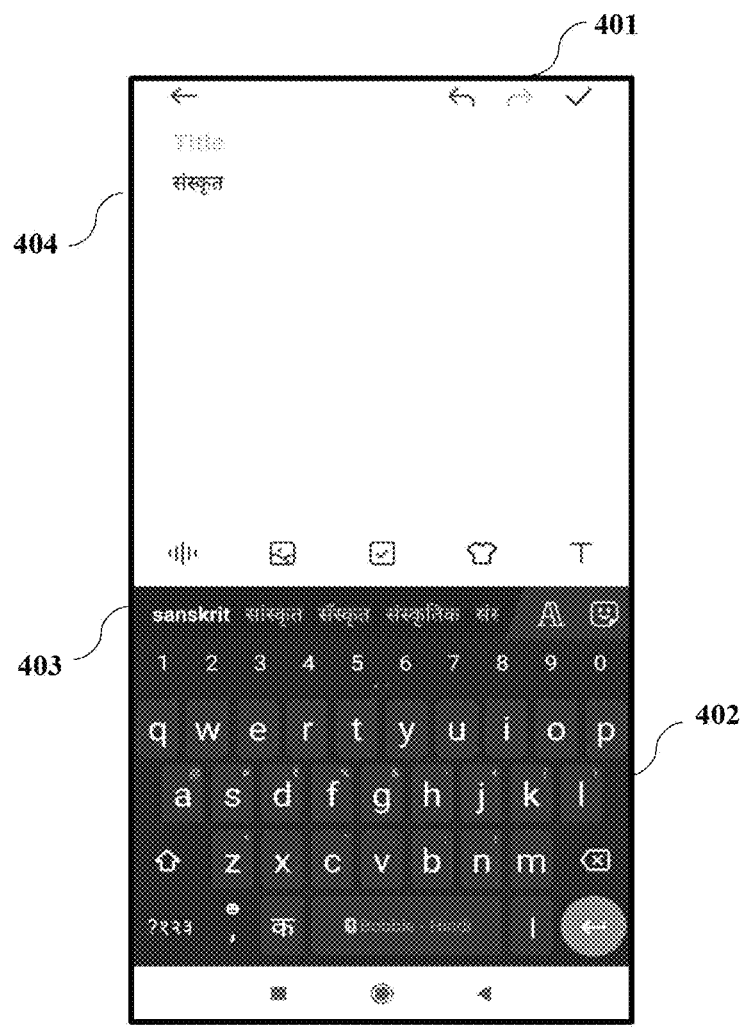

FIG. 4A-4C exemplarily illustrates a graphical representation displayed on a display unit of an electronic device, showing a transliterated text suggestions on a suggestion bar interface 403, according to an embodiment herein. When a user invokes an input interface 401, for example, the keyboard interface 402, through a user application, the transliteration engine 106 displays a predetermined number of transliterated suggestions for the input text default in the suggestion bar 403 positioned in a row of the keyboard interface 402. According to an embodiment herein, the transliteration engine 106 displays transliterated suggestions and predictions above the keyboard interface 402. For example, the user input the word 'sheershak' in the typing bar 404 and the transliteration engine 106 generates a plurality of suggestions in the suggestion bar 403.

Figure 5:
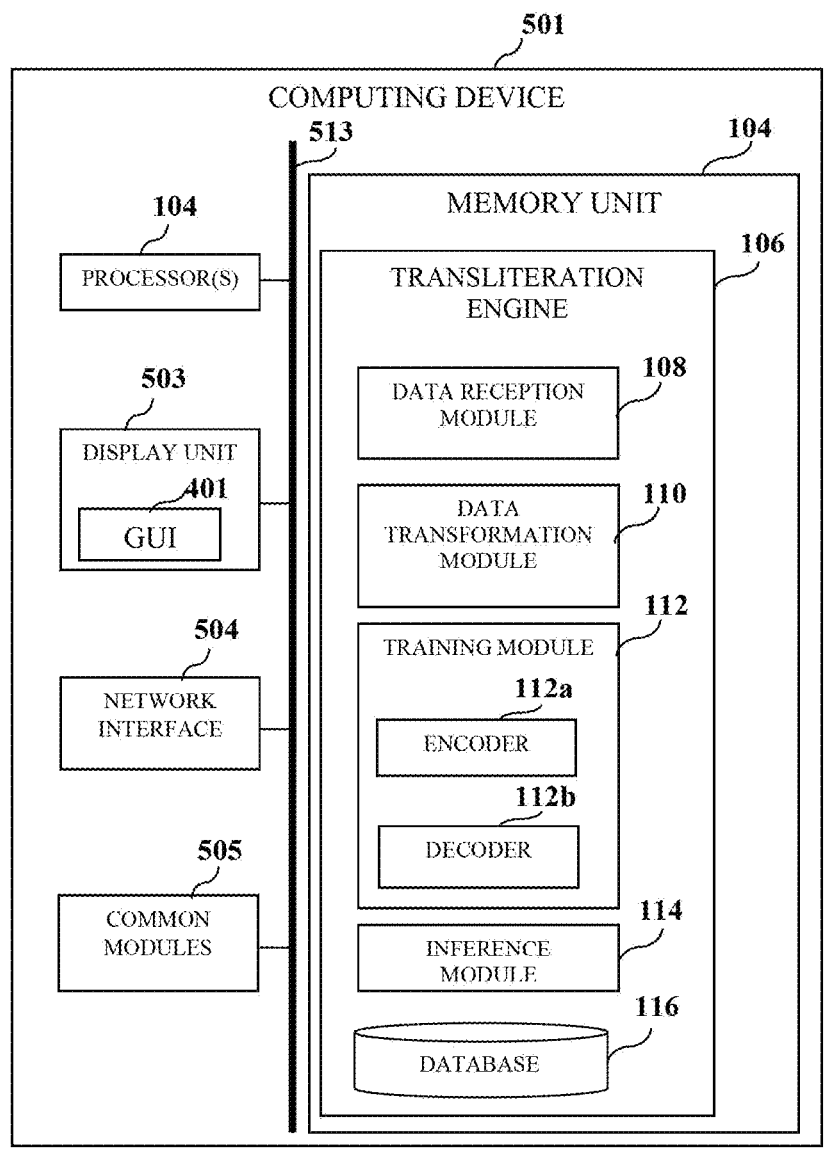
FIG. 5 illustrates an architectural block diagram of an exemplary implementation of a system for transliterating text in one of a plurality of input languages into out text using machine transliteration, according to an embodiment herein.

FIG. 5 illustrates an architectural block diagram of an exemplary implementation of the system 100 for converting input text in first language into output text in the second language using machine transliteration, in a computing device 501, according to an embodiment herein. According to an embodiment herein, the AI-based transliteration engine 106 (used interchangeably with the term transliteration engine 106) of the system 100 disclosed herein is deployed in the computing device 501 as exemplarily illustrated in FIG. 5. The computing device 501 is a computer system programmable using high-level computer programming languages. The computing device 501 is an electronic device, including for example, one or more of a personal computer, a tablet computing device, a mobile computer, a mobile phone, a smart phone, a portable computing device, a laptop, a personal digital assistant, a wearable computing device such as smart glasses, a smart watch, a touch centric device, a workstation, a client device, a server, a portable electronic device, a network enabled computing device, an interactive network enabled communication device, an image capture device, any other suitable computing equipment, combinations of multiple pieces of computing equipment, and the like. According to an embodiment herein, the transliteration engine 106 is implemented in the computing device 501 using a programmed and purposeful hardware. According to an embodiment herein, the transliteration engine 106 is a computer-embeddable system that converts text of first language into output text of second language using machine transliteration.

According to an embodiment herein, the transliteration engine 106 is accessible to users, for example, through a broad spectrum of technologies and user devices such as smart phones, tablet computing devices, endpoint devices, and the like, with access to a network, for example, a short-range network or a long-range network. The network is, for example, one of the internets, an intranet, a wired network, a wireless network, a network that implements Wi-Fi® of Wi-Fi Alliance Corporation, a mobile telecommunication network, etc., or a network formed from any combination of these networks.

As illustrated in FIG. 5, the computing device 501 comprises at least one processor 104 and a non-transitory, computer-readable storage medium, for example, a memory unit 102, for storing computer program instructions defined by modules, for example, 108, 110, 112, 114, etc., of the transliteration engine 106. According to an embodiment herein, the modules, for example, 108, 110, 112, 114, etc., of the transliteration engine 106 are stored in the memory unit 102 as illustrated in FIG. 5. The processor 104 is operably and communicatively coupled to the memory unit 102 for executing the computer program instructions defined by the modules, for example, 108, 110, 112, 114, etc., of the transliteration engine 106. The processor 104 refers to any one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. The transliteration engine 106 is not limited to employing the processor 104. According to an embodiment herein, the transliteration engine 106 employs one or more controllers or microcontrollers.

As illustrated in FIG. 5, the computing device 501 comprises a data bus 513, a display unit 503, a network interface 504, and common modules 505. The data bus 513 permits communications between the modules, for example, 502, 503, 504, 505, and 506. The display unit 503, via a graphical user interface (GUI) 401, displays information, display interfaces, user interface elements such as checkboxes, input text fields, etc., for example, for allowing a user to invoke and execute the transliteration engine 106, input data and perform input actions for triggering various functions such as configuring a beam width for beam search decoding, and the like.

The network interface 504 enables connection of the transliteration engine 106 to the network. The network interface 504 is, for example, one or more of infrared interfaces, interfaces implementing Wi-Fi® of Wi-Fi Alliance Corporation, universal serial bus interfaces, FireWire® interfaces of Apple Inc., interfaces based on transmission control protocol/internet protocol, interfaces based on wireless communications invention such as satellite invention, radio frequency invention, near field communication, etc. The common modules 505 of the computing device 501 comprise, for example, input/output (I/O) controllers, input devices, output devices, fixed media drives such as hard drives, removable media drives for receiving removable media, etc. Computer applications and programs are used for operating the transliteration engine 106. The programs are loaded onto fixed media drives and into the memory unit 102 via the removable media drives. According to an embodiment herein, the computer applications and programs are loaded into the memory unit 102 directly via the network.

According to an embodiment herein, the transliteration engine 106 comprises modules defining computer program instructions, which when executed by the hardware processor 104, cause the processor 104 to transliterate input text of first language into the output text of second language. According to an embodiment herein, the modules of the transliteration engine 106 comprise a data reception module 108, a data transformation module 110, a training module 112, an inference module 114, and a database 116. The database 116 stores, for example, text files received as input text for transliteration and a corpus containing large datasets of curated and augmented texts. The data reception module 108 receives an input text in any input language, for example, Latin characters of English language. The data transformation module 110 transforms the input text into transliterated text comprising characters of a second language, for example, Hindi language with Devanagari characters, using transliteration, for example, WFST model, along with word mapping model, and character mapping, as disclosed in the detailed description of FIG. 3.

According to an embodiment herein, the training module 112 comprises an encoder 112a and a decoder 112b. The encoder 112a trains a pre-trained model with the data files and corresponding transliterated text using transfer learning. The acoustic model is pretrained on multiple datasets of the base language. The decoder 112b performs decoding, for example, an output text of the trained model to generate text comprising characters of the second language, for example, Hindi, as disclosed in the detailed description of FIGS. 1-3. According to an embodiment herein, decoder 112b improves the accuracy of the generated text comprising characters of the second language, for example, Hindi, by using a pre-trained customized language model. The data transformation module 110 then transliterates the generated text to output text comprising characters in the second language, for example, Devanagari characters. The inference module 114 executes the inference stage, where the inference module 114 receives a text file as input, processes the input text data through the pretrained language model, and through the pre-trained customized language model, and generates output text data in a second language According to an embodiment herein.

The data reception module 108, the data transformation module 110, the training module 112, and the inference module 114 are disclosed above as software executed by the processor 104. According to an embodiment herein, the modules, for example, 508, 509, 510, and 511 of the transliteration engines 106 are implemented completely in hardware. In another embodiment, the modules of the transliteration engine 106 are implemented by logic circuits to perform their respective functions disclosed above. In another embodiment, the transliteration engine 106 is also implemented as a combination of hardware and software including one or more processors, for example, 502, that are used to implement the modules, for example, 108, 110, 112 and 114 of the transliteration engine 106. The processor 104 retrieves instructions defined by the data reception module 108, the data transformation module 110, the training module 112, and the inference module 114 from the memory unit 102 for performing respective functions disclosed above. The non-transitory, computer-readable storage medium disclosed herein stores computer program instructions executable by the processor 104 for converting text using machine transliteration.

Figure 6A:
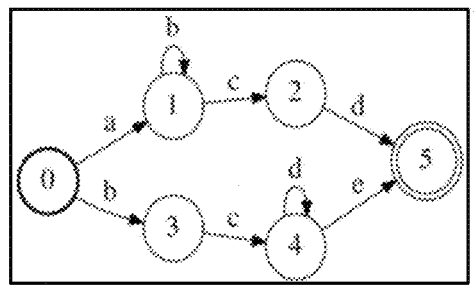
FIG. 6A-6C illustrates the finite-state machine, finite-state transducer, and a weighted finite-state transducer, according to an embodiment herein.
Figure 6B:
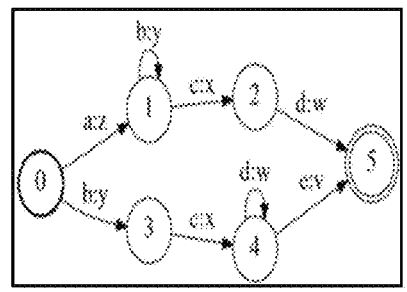
Figure 6C:
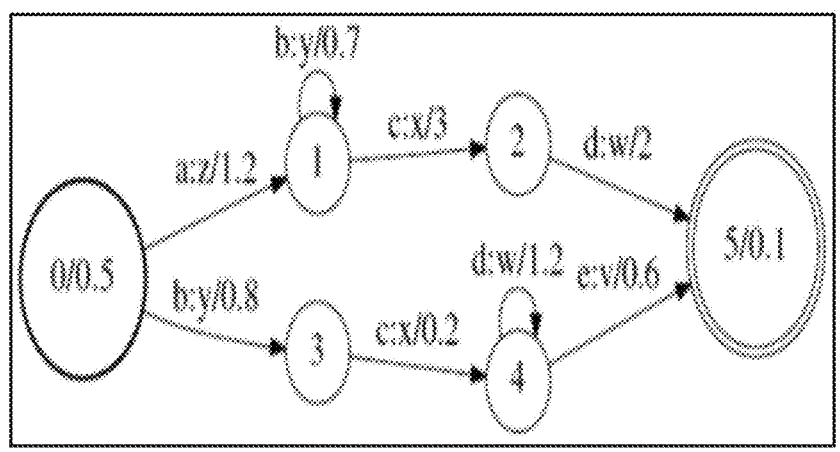

FIG. 6A-6C illustrates the finite-state machine, finite-state transducer, and a weighted finite-state transducer, according to an embodiment herein. A finite-state transducer (FST) is a finite-state machine with two memory tapes, following the terminology for Tuning machines: an input tape and an output tape. This contrasts with an ordinary finite-state automaton, which has a single tape. An FST is a type of finite-state automaton (FSA) that maps between two sets of symbols. An FST is more general than an FSA. An FSA defines a formal language by defining a set of accepted strings, while an FST defines relations between sets of strings. An FST will read a set of strings on the input tape and generate a set of relations on the output tape. An FST can be thought of as a translator or relater between strings in a set. When FSTs are added with weights, where each transition is labelled with a weight in addition to the input and output labels.

A Weighted Finite State Transducer (WFST) over a set K of weights can be defined as an 8-tuple $T=(Q, \Sigma, \Gamma, I, F, E, \lambda, \rho)$, where:

Q is a finite set, the set of states;
Σ is a finite set, called the input alphabet;
Γ is a finite set, called the output alphabet;
I is a subset of Q, the set of initial states;
F is a subset of Q, the set of final states; and
$E \subseteq Q \times (\Sigma \cup \{\epsilon\}) \times (\Gamma \cup \{\epsilon\}) \times Q \times K$ (where ε is the empty string) is
the finite set of transitions;
λ: I→K maps initial states to weights;
ρ: F→K maps final states to weights.

In order to make certain operations on WFSTs well-defined, it is convenient to require the set of weights to form a semiring. Two typical semirings used in practice are the log semiring and tropical semiring: nondeterministic automata may be regarded as having weights in the Boolean semiring. Stochastic FSTs (also known as probabilistic FSTs or statistical FSTs) are a form of weighted FST.

FIG. 7 illustrates various semiring types, according to an embodiment herein. The Open FST is an open-source library for weighted finite-state transducers (WFSTs). The Open FST consists of a C++ template library with efficient WFST representations and over 25 operations for constructing, combining, optimizing, and searching them. At the shell-command level, there are corresponding transducer file representations and programs that operate on them. The Open FST is designed to be both very efficient in time and space and to scale to exceptionally large problems. This library has key applications in speech, image, and natural language processing, pattern and string matching and machine learning. The Open FST Library closely parallels its mathematical foundations in the theory of rational power series. The library user can define the alphabets and weights that label transitions. The weights may represent any set so long as they form a semiring. A semiring $(K, \oplus, \otimes, 0, 1)$ is specified by a set of values K's, two binary operations ⊕ and ⊗, and two designated values 0 and 1 The operation ⊕ is associative, commutative, and has 0 as identity. The operation ⊗ is associative, has identity 1, distributes with respect to ⊕, and has 0 as annihilator: for all $a \in K$, $a \otimes 0 = 0 \otimes a = 0$. If ⊗ is also commutative, we say that the semiring is commutative.

A WFST, $T=(A, B, Q, I, F, E, \lambda, \rho)$ over a semiring K is specified by a finite input alphabet A, a finite output alphabet B, a finite set of states Q, a set of initial states $I \subseteq Q$, a set of final states $F \subseteq Q$, a finite set of transitions $E \subseteq Q \times (A \cup \{\epsilon\}) \times (B \cup \{\epsilon\}) \times K \times Q$, an initial state weight assignment λ: I→K, and a final state weight assignment ρ: F→K. E[q] denotes the set of transitions leaving state $q \in Q$.

Given a transition $e \in E$, p[e] denotes its origin or previous state, n[e] its destination or next state, i[e] its input label, o[e] its output label, and w[e] its weight. A path π=e1 ek is a sequence of consecutive transitions: n[ei−1]=p[ei], i=2, . . . , k. The functions n, p, and w on transitions can be extended to paths by setting: n[π]=n[ek] and p[π]=p[e1] and by defining the weight of a path as the ⊗-product of the weights of its constituent transitions: w[π]=w[e1]⊗⊗[ek]. More generally, w is extended to any finite set of paths. R by setting $w[R] = \oplus \pi \in R$ w[π]; if the semiring is closed, this is defined even for infinite R. We denote by P (q, q') the set of paths from q to q' and by P (q, x, y, q') the set of paths from q to q' with input label $x \in A^*$ and output label $y \in B^*$. These definitions can be extended to subsets R, $R' \subseteq Q$ by P (R, R')=∪q∈R, q'∈R'P (q, q'), P (R, x, y, R')=∪q∈R, q'∈R'P (q, x, y, q').

A transducer T is regulated if the weight associated by T to any pair of input-output string (x, y) given by:

$$[[T]](x,y) = \oplus \lambda[p[\pi]] \otimes w[\pi] \otimes \rho[n[\pi]] \pi \in P(I,x,y,F)$$

is well-defined and in K. If P (I, x, y, F)=Ø, then T (x, y)=0. A weighted transducer without ε-cycles is regulated.

Figure 8:
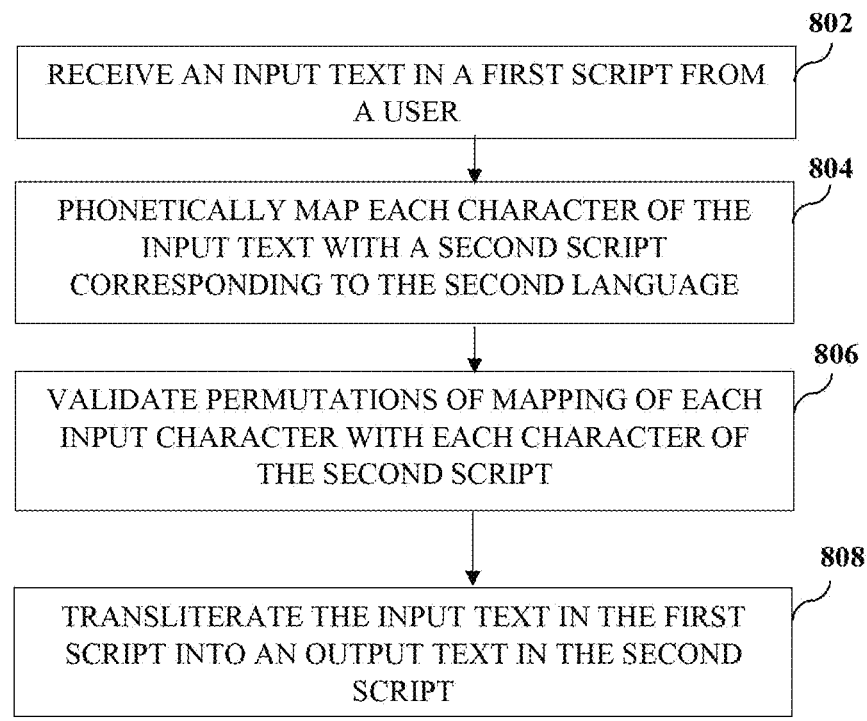
FIG. 8 illustrates a flowchart of a method for converting text in one of a plurality of input languages into a second language text using phonetic based transliteration, according to an embodiment herein.

FIG. 8 illustrates a flowchart of a method for converting text in one of a plurality of input languages into a second language text using phonetic based transliteration, according to an embodiment herein. The method disclosed herein employs an artificial intelligence (AI)-based transliteration engine executable by at least one processor for converting text in any input language into output text using machine transliteration. For purposes of illustration, the detailed description refers to a text input in an input language, for example, Latin characters, being converted into text comprising Devanagari characters; however, the scope of the method and the system disclosed herein is not limited to the output text being Devanagari characters but may be extended to include any Indian or Indic language or languages of other countries. The transliteration engine is configured to transliterate text in any input language to text comprising characters of a base language. In one embodiment, the speech transliteration engine is configured to transliterate text comprising Latin or English characters to text comprising characters of Devanagari or Hindi characters, based on mapping of the phonetics instead of word mapping using a pre-trained AI model.

The transliteration engine is integrated into an input interface of a user device. As used herein, "input interface" refers to an interface rendered on the user device, for example, a smartphone, for receiving one or more inputs from a user. For example, the input interface is a keyboard or a virtual keyboard that is invoked on the user device when a user clicks on an input field such as a text field provided by a user application such as a messaging application or a chat application. In the method disclosed herein, the transliteration engine is integrated within the input interface invoked on the user device, independent of a user application, for example, a messaging or messenger application, a chat application, etc. As the input interface such as a virtual keyboard is opened and closed only during an input action into an input field of the user application, the operations and functions the engine is configured to be independent of the user application or any application that is present in the foreground.

In the method disclosed herein, the transliteration engine, at step 802, receives an input text in a first script from the user, for example, Latin or English characters. As used herein, the term "first script" refers to words or characters of a first language. For example, if the first language is English then the corresponding first script refers to Latin characters. The transliteration engine which is integrated with the input interface is configured to receive the input text in the first script which is further configured to be phonetically transliterated into a "second script." For example, consider the input text contains the word 'SANSKRIT' which is inputted into the input interface by the user. The input text is further configured to be converted into output text of the second script. For example, consider the output text contains the word ' संस्कृत ' transliterated from the 'SANSKRIT.'

At 804, the transliteration engine is configured to phonetically map each grapheme (or character) of the input text with a second script. According to an embodiment herein, for mapping each character of the input text with the phonemes based matching characters of the second script. For example, the transliteration engine is configured to align a Devanagari script of word ' संस्कृत ' with its romanization version 'Sanskrit.' in one embodiment, the transliteration engine utilizes the Unicode symbol sequence, for example, the Unicode symbol sequence for the input text 'Sanskrit,'

' स○ंस○ंक○ंत ': s: स, a: ϵ, n: ○ं, s: स, ϵ: ○ं, k: क, r: ○ं, i: ϵ, t: त

The Unicode symbols sequence on either the input or the output may not directly correspond to a symbol on the other side, that is, in the present example, 'a,' 'i' and ○ं, which is represented with an ϵ on the other side of the transduction. We make use of the Unicode symbol sequence (स○ंस○ंक○ंत) with its Romanised word Sanskrit.

s: स a: ϵ n: ○ं s: स ϵ: ○ं k: क r: ○ं i: ϵ t: त

Note that symbols on either the input or the output may not directly correspond to a symbol on the other side (such as 'a,' 'i' and ○ं in the above example), which we represent with an c on the other side of the transduction. This explains the method of creating a training set for models based on define vocab. Expectation maximization (EM) is used to learn effective alignments of this sort. We built an n-gram model to produce joint probabilities over sequences of such pairs.

According to an embodiment herein, the transliteration engine is configured to utilize Expectation Maximization (EM) algorithm as an approach for performing maximum likelihood estimation in the presence of latent variables. It can be used for the latent variables (variables that are not directly observable and are actually inferred from the values of the other observed variables) too in order to predict their values with the condition that the general form of probability distribution governing those latent variables is already known. This algorithm is actually at the base of many unsupervised clustering algorithms in the field of machine learning.

The algorithm comprises following steps:
1. Given a set of incomplete data, consider a set of starting parameters.
2. Expectation step (E-step): Using the observed available data of the dataset, estimate (guess) the values of the missing data.
3. Maximization step (M-step): Complete data generated after the expectation (E) step is used in order to update the parameters.
4. Repeat Expectation step and Maximization step until convergence.
5. Given a lexicon of words and their transliterations, expectation maximization (EM) is used to learn effective alignments of the input:output pairs sorting.

The lexicon of input words and their pronunciations or transliterations, for example, 'Sanskrit' is a romanization of संस्कृत, are straightforwardly used to learn effective alignments of input words with that of output words. In one embodiment, for grapheme to phoneme conversion, wherein the grapheme to phoneme conversation is a method of per-symbol alignment of both the input string and the output string. For example, the word "phlegm" is pronounced F L EH M and one natural alignment between the grapheme and phoneme sequences is: p: ϵ h: F l: L e:EH g: ϵ m: M. Grapheme-to-Phoneme (G2P) conversion is an important problem related to Natural Language Processing, Speech Recognition and Spoken Dialog Systems development. The primary goal of G2P conversion is to accurately predict the pronunciation or transliteration of a novel input word given only the spelling. The G2P conversion problem is typically broken down into several sub-problems: (1) Sequence alignment, (2) Model training and, (3) Decoding. The goal of (1) is to align the grapheme and phoneme sequence pairs in a training dictionary. The goal of (2) is to produce a model able to generate new transliteration for novel words. The goal of (3) is to find the most likely pronunciation given the model. The alignment comprises the proposed toolkit that implements a modified WFST-based version of the EM-driven multiple-to-multiple alignment algorithm. This algorithm is capable of learning natural G-P relationships like Sanskrit→स ○ स ○ क ○ त which were not possible with previous 1-to-1 algorithms. The Joint Sequence N-gram model is the transliteration model implemented by the toolkit is a straightforward joint N-gram model. The training corpus is constructed by extracting the best alignment for each entry. The training procedure is then, (1) Convert aligned sequence pairs to sequences of aligned joint label pairs, (g 1: p 1, g 2: p 2, . . . g n: p n);
(2) Train an N-gram model from (1);
(3) Convert the N-grain model to a WFST.

Step (3) may be performed with any language modelling toolkit. According to an embodiment herein MITLM is utilized.

The decoding comprises the proposed toolkit that provides varying support for three different decoding schemes. The default decoder provided by the distribution simply extracts the shortest path through the phoneme lattice created via composition with the input word. The recurrent Neural Network (RNN) Language Models have recently enjoyed a resurgence in popularity in the context of ASR applications. N-best reranking is then accomplished with the toolkit by configuring the decoder to output the N-best joint G-P sequences and employing RNNLM to rerank the N-best joint sequences.

The aligned letter to phoneme sequence of input:output pairs (or alternatively referred as 'permutations'), for example, symbols such as e:EH, are used to build an n-gram model to produce joint probabilities over sequences of the pairs, wherein the n-gram models are referred as pair language models (alternatively called as 'joint multi-gram models'). By conditioning the probability of the input:output mappings on the prior context, the transliteration engine appropriately conditions the probability of h: F on whether the previous mapping was p: E. As stated above, results of these models yield remarkably similar performance to more complex and compute-intensive modelling methods, and they can be directly encoded as Weighted Finite state Transducers (WFSTs), making them excellent candidates for low resource, low-latency models for mapping graphemes of the input words with the phonemes of the output words.

At 806, the transliteration engine validates the permutations of mapping of each input character with phoneme of every character of the second script. The transliteration engine is further configured to build n-gram model to produce joint probabilities over sequences of the pairs. In one embodiment, the transliteration engine is configured to score each permutation probability of input:output pair. For example, consider below scenarios where the score is calculated using joint probability of input:output pairs (s: स a: ε n:ं s: स ε: ○ॢ k: क r: ○ृ i: ε t:त )

Input Word: Score: Output Transliteration sequence
Sanskrit: 11.56: संसॢकृत
Sanskrit: 13.78: साСंसॢकृत
Sanskrit: 19.34: सःसॢकृत

According to an embodiment herein, for any weighted finite-state transducer, WFST is represented by 'T', wherein T=(Σ,Δ,Q,I,F,E,K) that is the 'T' includes input (Σ) and output (Δ) vocabularies, a finite set of states (Q), of one is the initial state (I), and a subset of states (F⊆Q) are final states; a weight semiring K; and a set of transitions(q,σ,δ, w,q')∈E, where q,q'∈Q are, respectively, the source and destination states of the transition, are at σ∈Σ,δ∈Δ and w∈K. Further, a weighted finite-state automaton is a special case where Σ=Δ and, for every transition, the condition is (q, σ, δ, w, q')∈E, σ=δ. In an exemplary embodiment, the Open FST library is used to encode and manipulate WFSTs, and, unless otherwise stated, use the tropical semiring for weights. As per FIG. 8, WFSTs generate input:output pairs and the engine builds n-gram model to produce joint probabilities over sequences of such pairs. At 808, the transliteration engine transliterates the input, text in the first script into the output text of second script based on the WFST model.

According to an embodiment herein, the transliteration engine is further configured to personalize the input text transliteration. As established, the Indian languages transliteration is very fuzzy. For example, "bahar" can be transliterated as "बहार" or "बाहर." The transliteration engine, by default, transliterate "Bahar" as "बहार" but the engine suggests the user with "बाहर" as well. If the user picks the suggested word, then the engine stores the user choice of word and next time whenever user types "bahar" the default transliteration is "बाहर." In one embodiment, the transliteration engine is configured with a character level filtration process to detect invalid words detection. For example, input text is "ok," the first generated output for the word "ok" is ओक़, which is an Invalid word and after filtration, the suggested output is ओक.

Figure 9:
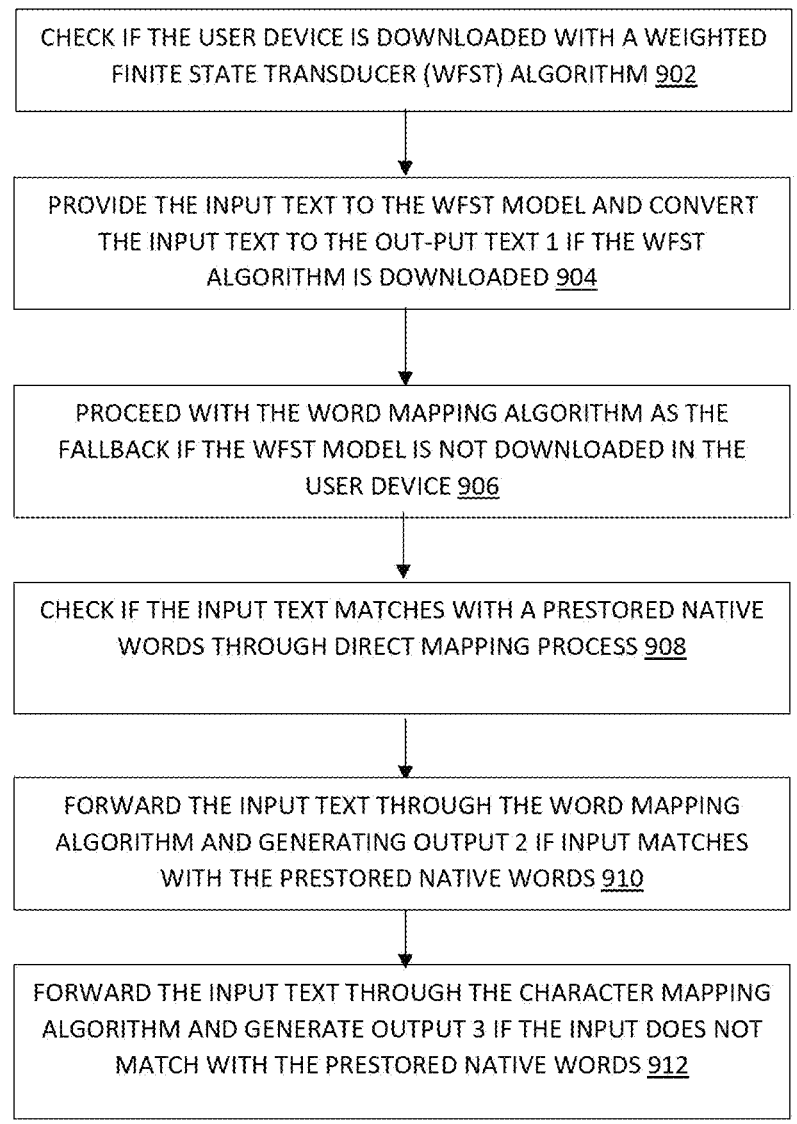
FIG. 9 illustrates a flowchart of a method for converting input text into output text, according to an embodiment herein.

FIG. 9 illustrates the flowchart of a method for converting input text into output text, according to an embodiment herein. At step 902, the user device is checked if it is downloaded with a weighted finite state transducer (WFST) algorithm. At step 904, the input text is provided to the WFST model, and the input text is converted to the output text 1 if the WFST algorithm is downloaded. At step 906, the word mapping algorithm proceeds as the fallback if the WFST model is not downloaded in the user device. At step 908, the input text is checked to see if it matches with a prestored native words through direct mapping process. At step 910, the input text is forwarded through the word mapping algorithm and output 2 is generated if input matches with the prestored native words. At step 912, the input text is forwarded through the character mapping algorithm and output 3 is generated if the input does not match with the prestored native words.

The embodiments herein disclose an AI-based transliteration engine for conversion of text in first language into text in second language based on combination of algorithms. The embodiments herein disclose multiple applications involving text-to-text conversations from Latin to Hindi, other Indic languages such as Tamil, Telugu, Kannada, Malayalam, or any other language spoken in the world. The embodiments herein can be used by third parties, research industries, firms or academic institutions working on transliteration, businesses requiring data-driven strategies, research-based industries, software sectors, cloud-based companies. AI-based conversation media entities, etc. The embodiments herein preclude the need for investing substantial amounts of money, time, and human resources on building AI models for speech recognition for multiple languages.

The foregoing examples and illustrative implementations of the various embodiments have been provided merely for explanation and are in no way to be construed as limiting the embodiments herein. While the embodiments herein have been described with reference to various embodiments, illustrative implementations, drawings, and techniques, it is understood that the words, which have been used herein, are words of description and illustration, rather than words of limitation. Although the embodiments herein have been described herein with reference to means, materials, embodiments, techniques, and implementations, the embodiments herein are not intended to be limited to the particulars disclosed herein; rather, the embodiments herein extend to all functionally equivalent structures, methods and uses, such as are within the scope of the appended claims. It will be understood by those skilled in the art, having the benefit of the teachings of this specification, that the embodiments herein are capable of modifications and other embodiments may be effected and changes may be made thereto, without departing from the scope and spirit of the embodiments herein.

What is claimed is:

1. A method for converting text in one of a plurality of input languages into a text in a second language using phonetic based transliteration, the method comprising:
  receiving an input text in a first script from a user;
  phonetically mapping each character of the input text with each character of a second script corresponding to the second language;

generating a plurality of permutations of the mapping of each character of the input text with each character of the second script corresponding to the second language;

validating a specific permutation of the plurality of permutations using a dictionary of the second language, wherein the validation comprises validating the plurality of permutations of the mapping of each input character with a phoneme of every character of the second script;

discarding a first plurality of permutations of the plurality of permutations based on the validation of the specific permutation; and transliterating (808) the input text in the first script into an output text in the second script based on the validation of the specific permutation of the plurality of permutations; and performing a grapheme to phoneme (G2P) conversation using a per-symbol alignment of an input string and an output string, wherein the G2P conversion further comprises:
- converting aligned sequence pairs to sequences of aligned joint label pairs;
- training an N-gram model from converting aligned sequence pairs; and
- converting the trained N-grain model to a Weighted Finite State Transducers (WFST).

2. The method as claimed in claim 1, wherein transliterating comprises performing a machine transliteration using an artificial intelligence (AI)-based transliteration engine (106) executable by at least one processor for converting text in any input language into output text.

3. The method as claimed in claim 2, wherein the transliterating comprises transliterating text in an input language to a text comprising one or more characters of a base language.

4. The method as claimed in claim 2, wherein transliterating comprises transliterating using a speech transliteration engine, a text comprising Latin or English characters to a text comprising characters of Devanagari or Hindi characters, based on mapping of the phonetics instead of word mapping using a pre-trained artificial intelligence (AI) model.

5. The method as claimed in claim 2, wherein the AI based transliteration engine is integrated into an input interface (401) of a user device.

6. The method as claimed in claim 1, wherein the AI based transliteration engine utilizes a Unicode symbol sequence.

7. The method as claimed in claim 1, wherein the AI based transliteration engine is configured to utilize Expectation Maximization (EM) algorithm as an approach for performing maximum likelihood estimation in the presence of latent variables.

8. The method as claimed in claim 7, wherein the latent variables are the variables not directly observable and are actually inferred from the values of the other observed variables.

9. The method as claimed in claim 7, wherein an expectation maximization (EM) algorithm is used for latent variables to predict the values with the condition comprising a general form of probability distribution governing the latent variables is known.

10. The method as claimed in claim 1, wherein a primary goal of G2P conversion is to accurately predict the pronunciation or transliteration of a novel input word given the spelling.

11. The method as claimed in claim 1, further comprising:
- building the N-gram model to produce joint probabilities over sequences of the pairs; and
- generate score for the mapping of each input character with the phoneme of every character of the second script.

* * * * *